(12) United States Patent
Cameron et al.

(10) Patent No.: US 11,782,800 B2
(45) Date of Patent: Oct. 10, 2023

(54) METHODS TO AUTOMATICALLY CORRECT AND IMPROVE SYSTEM RECOVERY AND REPLICATION PROCESSES

(71) Applicant: Cristie Software Ltd, Stroud (GB)

(72) Inventors: Ian Cameron, Stroud (GB); James Reynolds, Stroud (GB); Scott Sterry, Stroud (GB)

(73) Assignee: CRISTIE SOFTWARE LTD, Stroud (GB)

( * ) Notice: Subject to any disclaimer, the term of this patent is extended or adjusted under 35 U.S.C. 154(b) by 128 days.

(21) Appl. No.: 17/106,972

(22) Filed: Nov. 30, 2020

(65) Prior Publication Data

US 2021/0173750 A1 Jun. 10, 2021

(30) Foreign Application Priority Data

Dec. 5, 2019 (GB) ...................................... 1917833

(51) Int. Cl.
*G06F 12/00* (2006.01)
*G06F 11/14* (2006.01)
(Continued)

(52) U.S. Cl.
CPC ........ *G06F 11/1469* (2013.01); *G06F 9/4411* (2013.01); *G06F 9/45558* (2013.01); *G06F 11/1471* (2013.01); *G06F 40/205* (2020.01); *G06F 2009/4557* (2013.01); *G06F 2009/45562* (2013.01)

(58) Field of Classification Search
CPC ............. G06F 11/1446; G06F 11/1448; G06F 11/1451; G06F 11/1453; G06F 11/1456; G06F 11/1458; G06F 11/1461; G06F 11/1464; G06F 11/1466; G06F 11/1469; G06F 11/1471; G06F 11/2053; G06F 11/2056; G06F 11/2058; G06F 11/2061; G06F 11/2064; G06F 11/2066; G06F 11/2069; G06F 11/2071; G06F 11/2074; G06F 11/2076; G06F 11/2079; G06F 11/2082; G06F 11/2084; G06F 11/2087; (Continued)

(56) References Cited

U.S. PATENT DOCUMENTS 7,370,233 B1 * 5/2008 Sobel ................. G06F 11/1458
714/41
8,041,679 B1 * 10/2011 Narayanan .......... G06F 11/1471
707/648

(Continued)

OTHER PUBLICATIONS

A Directed Acyclic Graph Approach to Online Log Parsing, He (Year: 2018).*

*Primary Examiner* — Arvind Talukdar
(74) *Attorney, Agent, or Firm* — Invention To Patent Services; Alex Hobson

(57) ABSTRACT

A backup recovery and testing method is disclosed. The recovery method restores backed-up systems according to a stored configuration, and collects logs as the restored systems start up. The collected logs are compared with stored baseline logs, by a process which includes parsing the logs into templates and parameters, and identifying anomalies automatically for example by principal component analysis. Anomalies identified may be used to modify the stored configuration.

18 Claims, 2 Drawing Sheets

(51) Int. Cl.
*G06F 40/205* (2020.01)
*G06F 9/4401* (2018.01)
*G06F 9/455* (2018.01)

(58) Field of Classification Search
CPC .............. G06F 11/2089; G06F 11/2092; G06F 11/2094
See application file for complete search history.

(56) References Cited

U.S. PATENT DOCUMENTS

| | | | |
|---|---|---|---|
| 2012/0150805 A1* | 6/2012 | Pafumi | G06F 11/1464 707/E17.007 |
| 2013/0332771 A1 | 12/2013 | Salapura et al. | |
| 2014/0215267 A1* | 7/2014 | Hegdal | G06F 11/1471 714/20 |
| 2016/0019107 A1 | 1/2016 | North | |
| 2020/0159624 A1* | 5/2020 | Malkov | G06N 20/00 |

* cited by examiner

METHODS TO AUTOMATICALLY CORRECT AND IMPROVE SYSTEM RECOVERY AND REPLICATION PROCESSES

CROSS REFERENCE TO RELATED APPLICATIONS

This application claims the benefit of GB1917833.4 filed on Dec. 5, 2019.

BACKGROUND OF THE INVENTION

Field of the Invention

The present invention relates to improvements in the recovery of backed-up computer systems, particularly automatic identification and remediation of faults in recovered systems.

Background

Complex IT systems underpin most modern organizations. Unavailability of these systems, for example because of hardware failure, fire, flood, theft, or power loss, is a serious risk to many businesses. Therefore, most businesses will put in place, or attempt to put in place, an effective business continuity plan. This will include regularly replicating or backing up computer systems and storing the backups to ensure availability in the case of "disaster" scenarios.

However, as businesses grow and the complexity of their IT systems increases, restoring working systems from the backups and/or replicas becomes an increasingly difficult problem. Working systems will fail to replicate or restore from backup for a range of reasons. Much of this problem relates to the fact that the environment in which the new systems are being created may not be identical to the production environment in which the working systems run. Improper or incomplete backup or replication procedures can also cause unexpected problems on the new systems. Also, there may be complex and poorly-documented inter-relationships between systems. These interrelationships are liable to change over time. Restoring all systems correctly, in the right order, can therefore take time to get right. In a disaster scenario, this is often time during which the business cannot function.

It is well known that the likelihood of a business continuity plan working successfully and quickly in the face of disaster is closely tied to how frequently the plan is tested. The plan is tested in a "Plan-Do-Check-Act" cycle in which systems are restored and tested in regular exercises. The idea is that any problems are identified during these test exercises, so when a system needs to be restored "for real" in a disaster scenario, there will be fewer problems and the system can be restored more quickly, with a greater chance of success. However, running these regular exercises can be very time consuming and expensive. In many smaller businesses there are simply no resources to do it. Even in larger businesses, the frequency of these tests may be heavily influenced by their cost.

It is an object of the invention to provide automated identification and remediation of faults in recovered systems.

SUMMARY OF THE INVENTION

According to the present invention there is provided a method of replicating or recovering a backed-up computer system, the method comprising:

creating a virtual environment in which to restore the system, the virtual environment being created according to a stored configuration;
restoring the system from backup or replicated data to the virtual environment;
starting up the restored system in the virtual environment, and collecting logs from the restored system;
automatically comparing the collected logs to stored baseline logs to identify anomalous events corresponding to error conditions;
making changes to the stored configuration according to the identified anomalous events;
repeating the above steps according to the new stored configuration, until no anomalous events corresponding to error conditions are identified.

The system may be restored from a backup, which may be a file-based backup. Alternatively, the system may be created by replication, i.e. files are restored from an online running system.

In some embodiments, the backup or replication procedure operates according to the stored configuration. The stored configuration may specify for example which files are included or excluded from the backup or replicated data. Where anomalous events indicate a problem with the backed-up data, for example missing files, the stored configuration may be altered so that future backups include all required files, for example.

By comparing the logs from the restored system as it starts up to stored baseline (known good) logs, problems may be identified. The problems may be solved by modifying the stored configuration. In some embodiments the stored configuration may be updated automatically.

A system may be a part of a complex system, the complex system including multiple different systems. Each "system" may run for example on one virtual machine or in one container—a system can, to an extent depending on the type of system, be independently restored to the virtual environment, configured and started up, and logs checked, according to the method of the invention.

The virtual environment, created according to the stored configuration, may include for example a virtual machine for each system, or a container for each system, or a combination of these for different systems.

In a complex system including multiple systems, the stored configuration may include a list of systems, and may further include an ordering or dependency graph linking the systems. As an example, one system may be a web application server, which will not work correctly without a database server (i.e. the web application server is a dependent system of the database server). The database server is another system. The database server is a required system of the web application server. The dependency graph, part of the stored configuration, may indicate that the web application server should not be started up until the database server has correctly started up with no errors.

Identifying anomalous events corresponding to error conditions may include identifying anomalous events corresponding to error conditions in one system caused by the unavailability of another system. Such error conditions may be solved by modifying the stored configuration to update the dependency graph to reflect the dependency of one subsystem on another.

The step of starting up the restored system may include the step of waiting until all required systems have already been correctly started. The method may further comprise issuing a notification when a system has been started up correctly with no anomalous events identified in the logs, i.e.

when the logs generated by the system sufficiently match the relevant baseline logs. The notification may be used as a trigger to cause the starting up of dependent systems (and the associated steps of comparing logs and making changes).

Restoring the system typically includes copying from backup files. Depending on how the backup files are stored, restoring the system may also include conversion and/or decompression steps. In different embodiments, the backups may be file-based backups, recovery images, block data copies, data exports, or any other type of backup which can be created and restored. Preferably, the backup or replication occurs according to the stored configuration.

In some embodiments the backup files are file-based backups, i.e. backups of file systems rather than "baremetal" recovery images. The file-based backups are potentially restored to different hardware, usually virtualized "hardware", compared to the hardware (which may or may not be virtualized) running the systems being backed up in the production environment.

Restoring the system may further include modifying the system from the backed-up or replicated system. The modification may be in accordance with the stored configuration. The modification may for example include installing drivers on the restored system, to allow the system to work with the (virtual) hardware in the restore environment. Conversely, the modification may for example include disabling drivers or services on the restored system, so that the system will continue to work in the absence of certain hardware which is present in the production environment but not in the restore environment. An example of this is management and diagnostic services associated with particular hardware.

If the correct drivers are not installed, this will cause an anomalous event indicating an error condition in the log when the system starts up. This will in turn cause the stored configuration to be modified so that the correct drivers are installed.

Modification of the system may include adding a logging driver to ensure that logged events can be captured when the system is starting up. The logging driver may send log events, for example, to a virtual serial console where they can be captured by a recovery control system. The recovery control system is hardware and/or software which operates the method of the invention.

Creating the virtual environment typically includes providing connectivity of systems between each other and to external systems. In most embodiments, the virtual environment will be at least partially isolated, so that testing can take place without disturbing running production systems. However, the stored configuration may include connections which are required for systems to work properly. As an example, a system may require a connection to an external license server. Starting up the system without that connection being available may result in anomalous events corresponding to error conditions in the logs. When these error conditions are identified, the stored configuration may be altered to allow limited connectivity between the system and the license server, so that the system may start up correctly in the test environment, and so may any dependent systems.

Creating the virtual environment includes creating appropriate virtual machines and/or containers into which the system(s) may be restored. Virtual machines may be specified according to the stored configuration which may include parameters such as memory, CPU resources, and virtual devices associated with each machine. A system which starts up with insufficient resources is likely to result in an anomalous event appearing in the log, indicating an error condition. According to the method of the invention, this will result in automatic changing of the stored configuration, for example to provide sufficient memory.

Creating the virtual environment may also include creating data structures required to support the data restoration. For example, appropriate partitions may be created on the virtual discs of virtual machines. Partitions may be created according to the stored configuration, which may be automatically updated if an error condition identified from system startup logs indicates that this should be done.

The stored baseline logs may come from two sources. Preferably, the systems being backed up produce logs as they are running in normal use. These logs are stored on the systems being backed up and are backed up or replicated with the rest of the system as part of a backup or replication process. In this case, baseline logs may be retrieved from the backup itself. When the restored system is started up, in many cases the backed-up log will be appended to. Determining the baseline may be carried out by splitting the log based on the timestamp of events, taking anything recorded before the time of restored system startup as part of the baseline, and anything afterwards as part of the restored system log. As an alternative, the baseline may be determined simply by taking a copy of the log from the backup before the system is started.

In addition to this, a stored database of known-good log files may be used. This may cover for example the very earliest stages of a system's boot process, which is not likely to be logged and stored in the backup. The stored database may contain, for example, a baseline log for each version of each operating system in use.

To facilitate comparison of collected logs, the collected logs and the baseline logs may be parsed to convert the logs into lists of templates and parameters. The DRAIN algorithm is known for performing this task.

A template corresponds to a particular form of log entry. A parameter will typically correspond to an entity to which that log entry relates. For example, a template may correspond to a log entry indicating that a network interface is up and working. The parameter may specify which interface.

The templates and parameters may be grouped into contiguous sets of related events. Known grouping algorithms may be used to perform this function by matching common parameters across multiple templates. One example is the word2vec algorithm.

To detect anomalies, principal component analysis may be used to determine anomalous templates or sequences of templates in the collected log files. Anomalous templates or sequences of templates are those which are unusual with respect to the baseline logs.

Once anomalous events have been identified, a lookup stage can search for potential solutions. This may use a knowledge base or expert system. The solution, when found, may be applied directly by modifying the stored configuration. Optionally, the modification of the stored configuration may take place automatically.

Log information may include application-specific log files and system log files generated within the virtual machines, as well as virtual machine log files which may be collected in the virtualization layer in a virtualized environment.

The method of the invention allows backed-up systems to be restored automatically. It is envisaged that this method will be carried out regularly as part of testing a continuity plan. The method iterates to identify and solve problems, and create a stored configuration which to the greatest extent possible restores systems to a working state automatically. This not only restores individual systems to a working state, but correctly handles interdependencies between parts of a complex system, to ensure that systems are started up in the correct order so that they work as intended.

The automated method of the invention significantly reduces the time and cost of testing exercises, allowing them to happen more frequently, significantly increasing the chances of success and decreasing the time necessary when recovering a system in a real disaster situation.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

For a better understanding of the present invention, and to show more clearly how it may be carried into effect, reference will now be made by way of example only to the accompanying drawings, in which.

DETAILED DESCRIPTION OF THE ILLUSTRATED EMBODIMENTS

Figure 1:
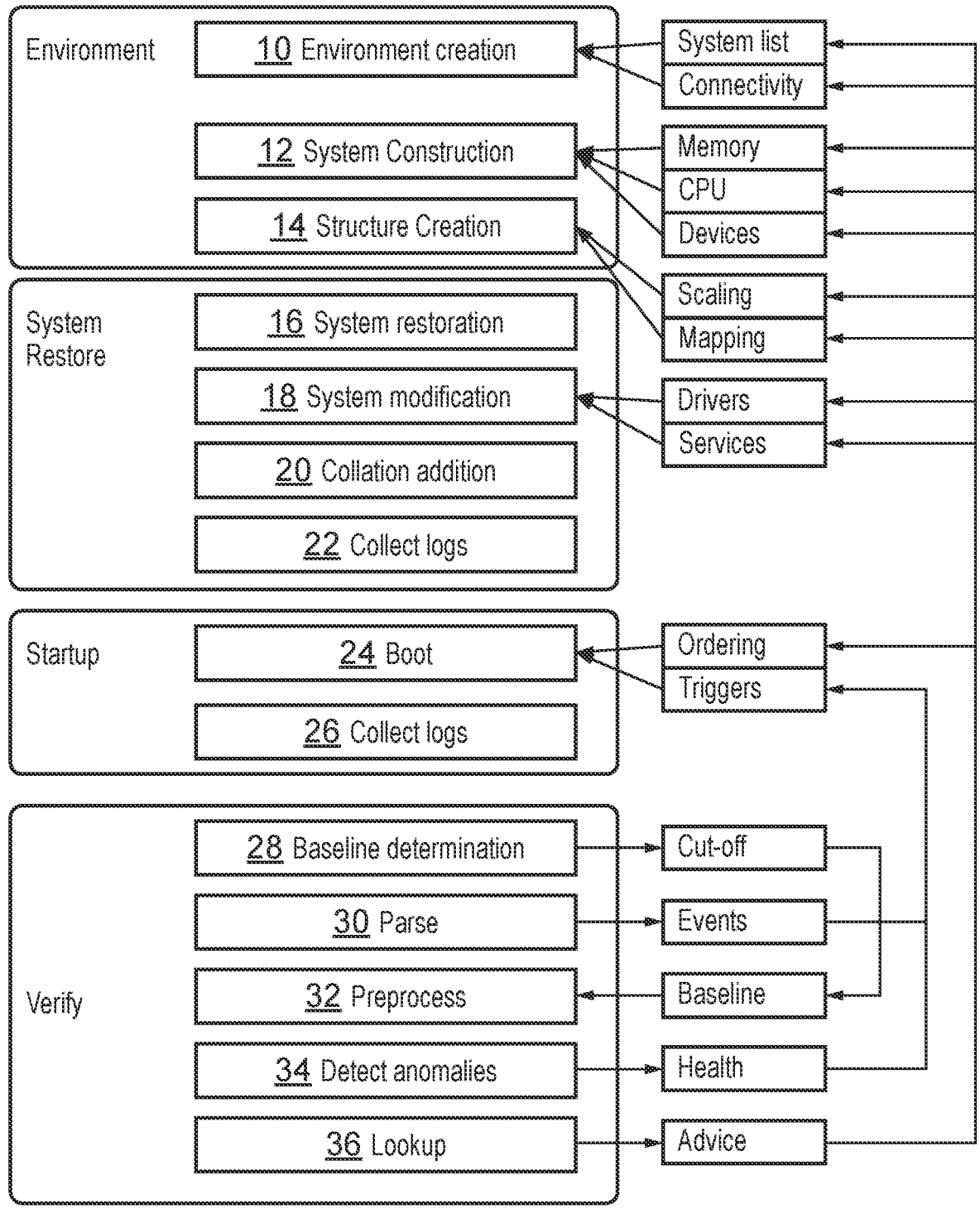
FIG. 1 shows the process stages of the method according to the invention.

Referring to FIG. 1, a method of restoring a system, or multiple systems making up a complex system, is illustrated. The systems are being restored into a restoration environment which may be based on different hardware from the environment on which the systems usually run in production. The restoration environment is likely to be virtualized in most embodiments, but the production environment may or may not be virtualized, or may be partly virtualized.

The method begins at step 10 where the environment is created. At a most basic level, the environment is a virtualization platform providing a place for virtual machines to be created, and a virtual network between the virtual machines. External connectivity may also be provided in some embodiments. In this embodiment, for each system being restored a virtual machine is created in step 12. Each virtual machine is given resources (e.g. memory, CPU and other hardware or virtual hardware) according to a stored configuration. At step 14 structures such as partitions are created on the virtual machines, again according to the stored configuration. This makes the virtual machines ready to receive files from a backed-up system.

In step 16, files from file-based backups are copied into each virtual machine. In step 18, the virtual machines, now containing copies of the backed-up systems, are modified. The modification takes place according to the stored configuration and may include, for example, installing drivers on the virtual machine so that the virtual machines are compatible with hardware or virtual hardware present in the restoration environment. Conversely, drivers or services present on the backed-up systems may be removed or disabled, if specific hardware is required for those services to work correctly. Hardware management services which are often installed on servers are an example of the type of service which may need to be disabled.

At step 20, a logging driver is added so that logs may be retrieved from the system as it starts up. The logging driver may for example send log events to a virtual serial console. These events can be retrieved by a recovery control system, i.e. a controller which carries out the whole method.

At step 22 logs are collected from the system. Note that at this stage, the system has not yet been started up. The logs collected are therefore backed-up logs which, for these purposes, can be treated as "known good" logs. They reflect how the system was operating when it was running in the production environment.

At step 24 the system is booted. Where there are multiple systems in the environment, this is done according to a dependency tree specified in the stored configuration and according to triggers which may be sent to initiate boot of systems when all other required systems have been successfully started up with no errors.

At step 26 logs are collected from the booted system.

At step 28 a baseline log is determined. This may be done simply by taking the log collected at step 22, or alternatively could be done by identifying a point in the log collected at step 26 corresponding to a time just before the system was booted in the restoration environment.

Figure 2:
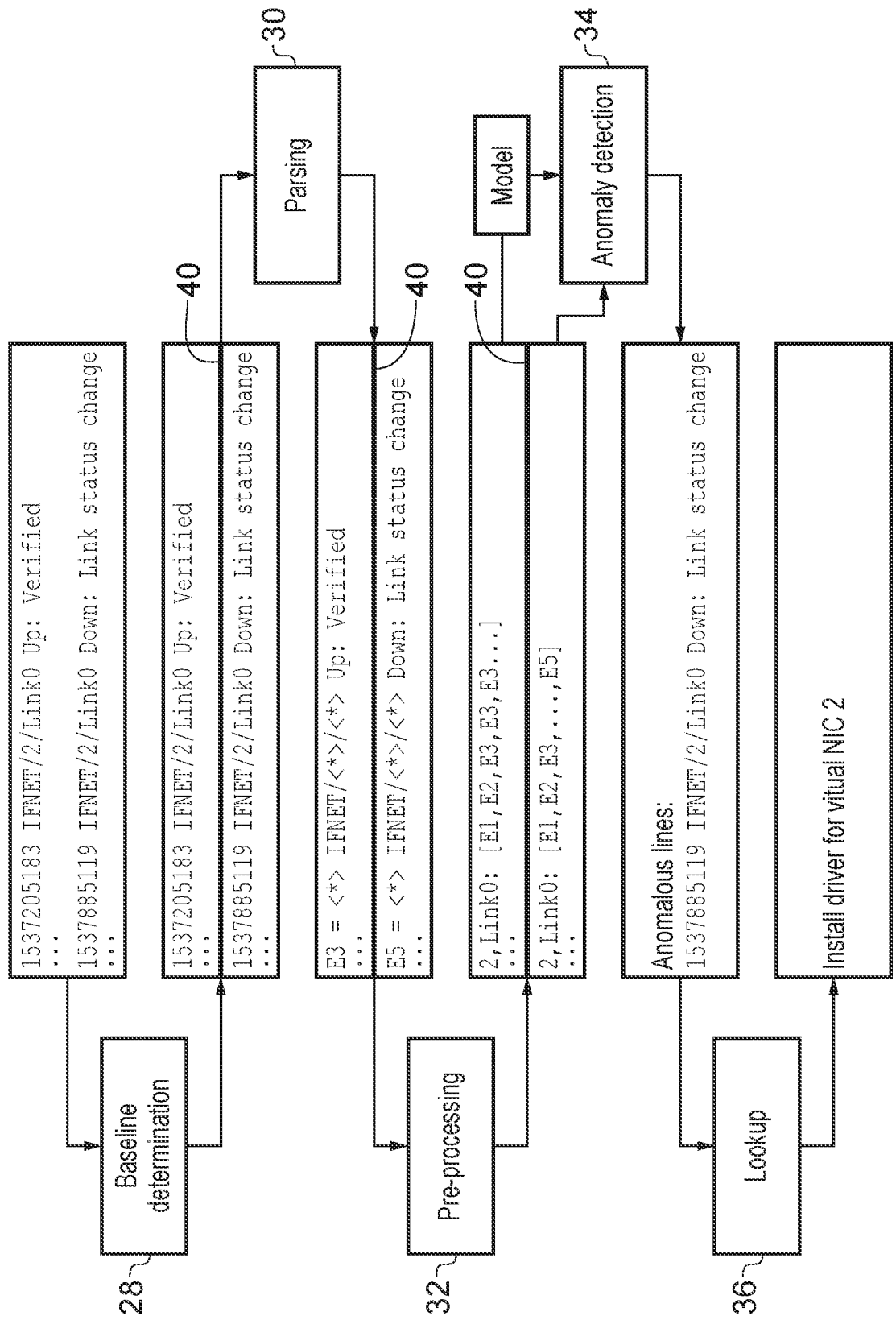
FIG. 2 shows an example of the log parsing and pre-processing stages of the method.

The parsing, pre-processing, and anomaly detection steps 30, 32, 34 are best understood with reference to FIG. 2. Note that in FIG. 2 the baseline has been determined by splitting a log file collected at step 26 at a timestamp, indicated by a horizontal line 40 in FIG. 2. The part of the log above the line 40 is the "known good" or baseline log, and the part of the log below the line 40 is the log from the system being started in the restoration environment.

In the parsing step 30, the log is parsed into templates and parameters by the DRAIN algorithm. The goal of this is to identify log items which are similar but not identical, and group the log items according to the similarities and differences. Hence in this example a template has been defined (automatically, by the DRAIN algorithm) as:

E3=<*> IFNET/<*>/<*> Up: Verified

Where E3 is a name for the template, and the part to the right of the = sign defines the template. <*> indicates a parameter which may be different in different log items all of which match the same template.

Likewise another example of a template from a log file may be:

E5=<*> IFNET/<*>/<*> Down: Link status change

In this example the raw "baseline" log file contains:

1537205183 IFNET/2/Link0 Up: Verified

This is template E3 with parameters {1537205183, 2, Link0}.

And the restored system log file contains:

1537885119 IFNET/2/Link0 Down: Link status change

This is template E5 with parameters {1537885119, 2, Link0}.

In the pre-processing step 32, the log file templates and parameters are grouped into contiguous sets of related events. As an example (and it will be apparent that the logs listed here and in FIG. 2 are incomplete) part of the output from the pre-processing step 32 may be the following lists of parameters and associated templates:

In the baseline log:

2, Link0: {E1, E2, E3, E3, E3 . . . }

And in the restored system log:

2, Link0: {E1, E2, E3 . . . E5}

By splitting the log file appropriately in the pre-processing step 32, an anomaly detection step 34 is facilitated. It will be apparent that the output from the pre-processing step is a distribution of templates and parameters. Anomaly detection may use techniques such as principal component analysis to identify anomalies in the restored system log compared with the baseline. In this case the anomalous record is:

2, Link0: E5

And this may be matched back to the original line in the restored system log which indicates a problem:

1537885119 IFNET/2/Link0 Down: Link status change

By the automatic process of comparing the restored system log with the known good baseline, this one line indicating a problem in the restored system can be identified automatically. Note that there is no requirement for the system to "know" that this type of event is an error, or "bad" in any sense.

As a result of identifying this event, it is apparent that there is a missing driver for a virtual network adaptor. The stored configuration may be modified so that step 18 will include the step of installing this driver, and the process repeated until there are no more errors.

Preferably the lookup step 36 uses an expert system to automatically search for a solution to the problem indicated by the detected anomalous line in the restored system log. Hence, in some embodiments, updating the stored configuration could be done completely automatically.

The embodiments described above are provided by way of example only, and various changes and modifications will be apparent to persons skilled in the art without departing from the scope of the present invention as defined by the appended claim

What is claimed is:

1. A method of recovering a backed-up computer system using a stored configuration, wherein the stored configuration includes a hardware or virtual hardware resource parameter and an instruction or set of instructions for modification of the backed-up computer system, the method comprising:
    creating a virtual environment in which to restore the backed-up computer system, the virtual environment being created according to the stored configuration;
    restoring the backed-up computer system from backup or replicated data to the virtual environment to produce a restored system including modifying the backed-up computer system, wherein modifying the backed-up computer system is done in accordance with the instruction or set of instructions for modifying the backed-up system of the stored configuration or the hardware or virtual hardware resource parameter of the stored configuration, the instructions or set of instructions being configured to enable the virtual environment to be compatible with hardware or virtual hardware present in the restored system; then
    starting up the restored system in the virtual environment, and collecting logs from the restored system;
    automatically comparing the collected logs to stored baseline logs to identify anomalous events corresponding to error conditions;
    automatically making changes to the stored configuration according to the identified anomalous events to create a new stored configuration;
    repeating the above steps according to the new stored configuration, until no anomalous events corresponding to error conditions are identified.

2. The method as claimed in claim 1, in which the instructions or set of instructions enable modification of the system including installing.

3. The method as claimed in claim 1, in which modifying the system includes adding a logging driver.

4. The method as claimed in claim 1, in which creating the virtual environment includes providing connectivity between multiple systems being restored.

5. The method as claimed in claim 1, in which creating the virtual environment includes providing connectivity to external networks.

6. The method as claimed in claim 5, in which connectivity to external networks is limited according to the stored configuration.

7. The method as claimed in claim 1, in which creating the virtual environment includes creating virtual machines and/or containers into which the system(s) is restored.

8. The method as claimed in claim 1, including the step of retrieving logs from the backup, and in which the stored baseline logs include the logs retrieved from the backup.

9. The method as claimed in claim 1, in which the collected logs and baseline logs are parsed to convert the logs into lists of templates and parameters.

10. The method as claimed in claim 9, in which the DRAIN algorithm is used for parsing.

11. The method as claimed in claim 9, in which the templates and parameters are grouped into contiguous sets of related events.

12. The method as claimed in claim 11, in which principal component analysis is used on the sets of events to identify anomalous log entries.

13. A non-transitory computer-readable medium containing instructions which, when executed on a computer, carry out the method of claim 1.

14. A method of recovering multiple backed-up computer systems from a stored configuration, wherein the stored configuration includes a dependency graph reflecting the dependency of each backed-up computer system of the multiple backed-up computer system, a hardware or virtual hardware resource parameter for each system, and an instruction or set of instructions for modifying the backed-up computer system, the method comprising:
    creating a virtual environment in which to restore the backed-up computer systems, the virtual environment being created according to the stored configuration;
    for each system, restoring the backed-up computer system from backup files to the virtual environment to produce a restored system including modifying the backed-up computer system, wherein modifying the backed-up computer system is done in accordance with the instruction or set of instructions for modifying the backed-up system of the stored configuration or the hardware or virtual hardware resource parameter of the stored configuration, the instructions or set of instructions being configured to enable the virtual environment to be compatible with hardware or virtual hardware present in the restored system; then
    starting up the restored systems in the virtual environment according to the dependency graph forming part of the stored configuration, the dependency graph linking the systems in order of startup, wherein each system is started if and only if any required systems are already started and healthy, and for each system collecting logs from the restored system;
    for each restored system, automatically comparing the collected logs to stored baseline logs to identify anomalous events corresponding to error conditions;
    for each restored system, making automatic changes to the stored configuration according to the identified anomalous events to create a new stored configuration;
    repeating the above steps according to the new stored configuration, until no anomalous events corresponding to error conditions are identified, and when no anomalous events are identified, issuing a notification that the restored system is healthy to trigger startup of any dependent systems.

15. A non-transient computer-readable medium containing instructions which, when executed on a computer, carry out the method of claim 14.

16. The method as claimed in claim 1, further comprising the step of searching for a potential solution for the identified anomalous events, wherein the step of automatically making changes to the stored configuration is performed according to the potential solution found for the identified anomalous events.

17. The method as claimed in claim 1, in which the hardware or virtual hardware resource parameter comprises at least one of memory, CPU resources, virtual devices associated with each machine, drivers and services.

18. The method of claim 14, in which the hardware or virtual hardware resource parameter comprises at least one of memory, CPU resources, virtual devices associated with each machine, drivers and services.

\* \* \* \* \*